April 26, 1932. I. T. BENNETT 1,855,565
INCLOSURE FOR RADIATORS
Filed April 15, 1929 7 Sheets-Sheet 1
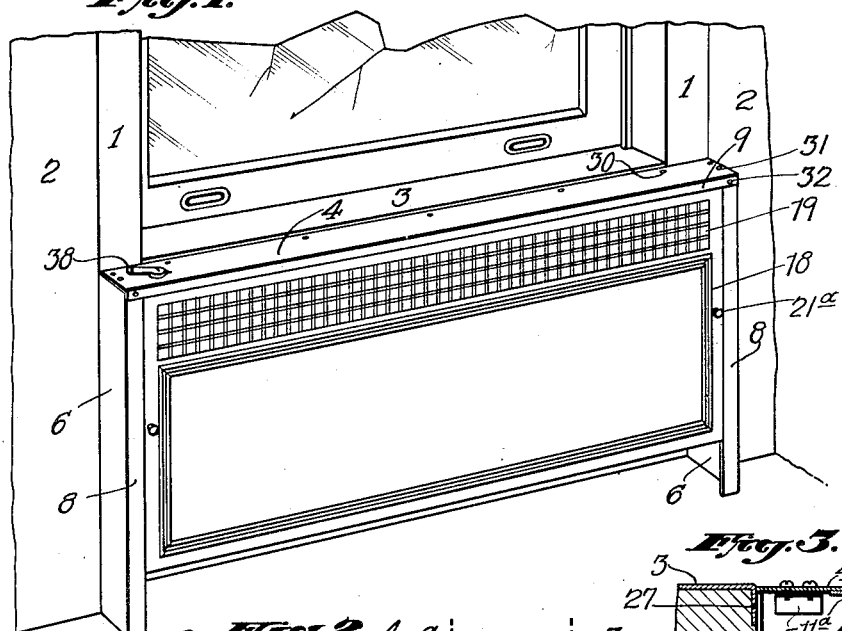
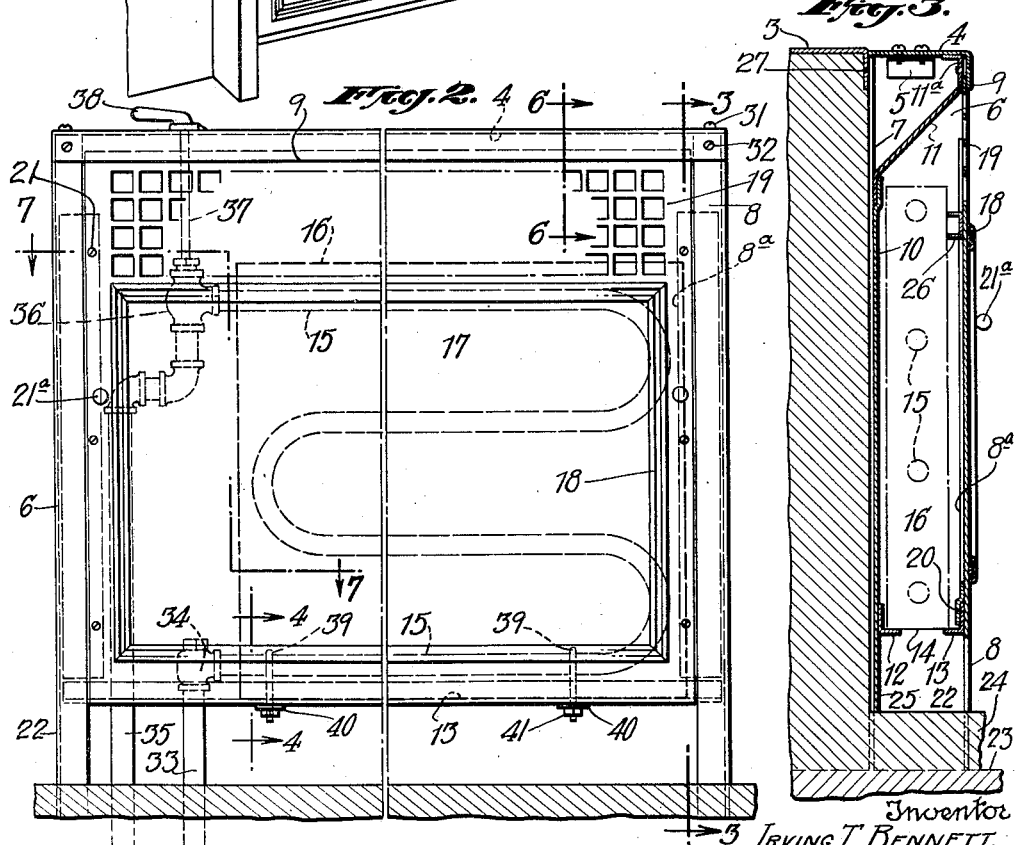

April 26, 1932. I. T. BENNETT 1,855,565
INCLOSURE FOR RADIATORS
Filed April 15, 1929   7 Sheets-Sheet 2
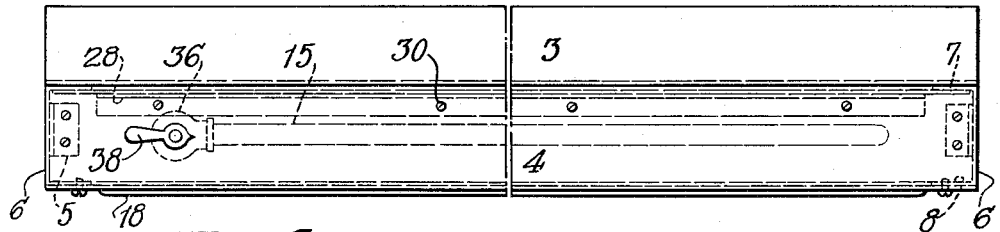
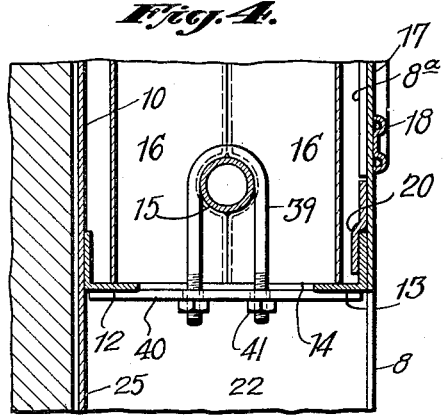
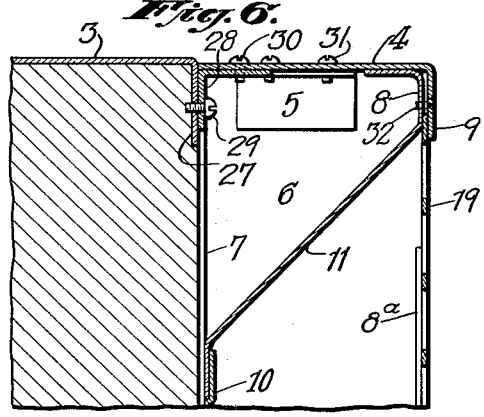
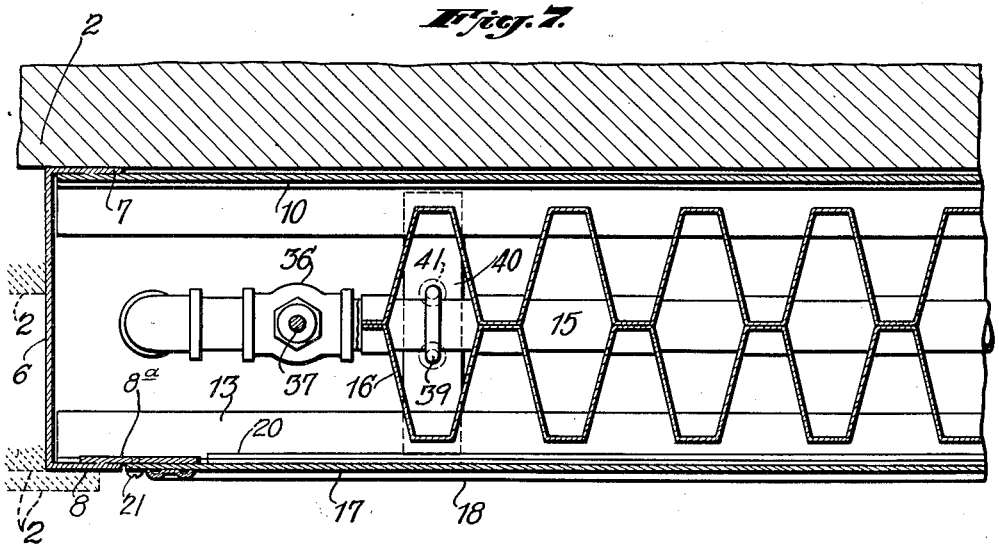
Inventor
IRVING T. BENNETT.
By His Attorneys April 26, 1932. I. T. BENNETT 1,855,565
INCLOSURE FOR RADIATORS
Filed April 15, 1929 7 Sheets-Sheet 3
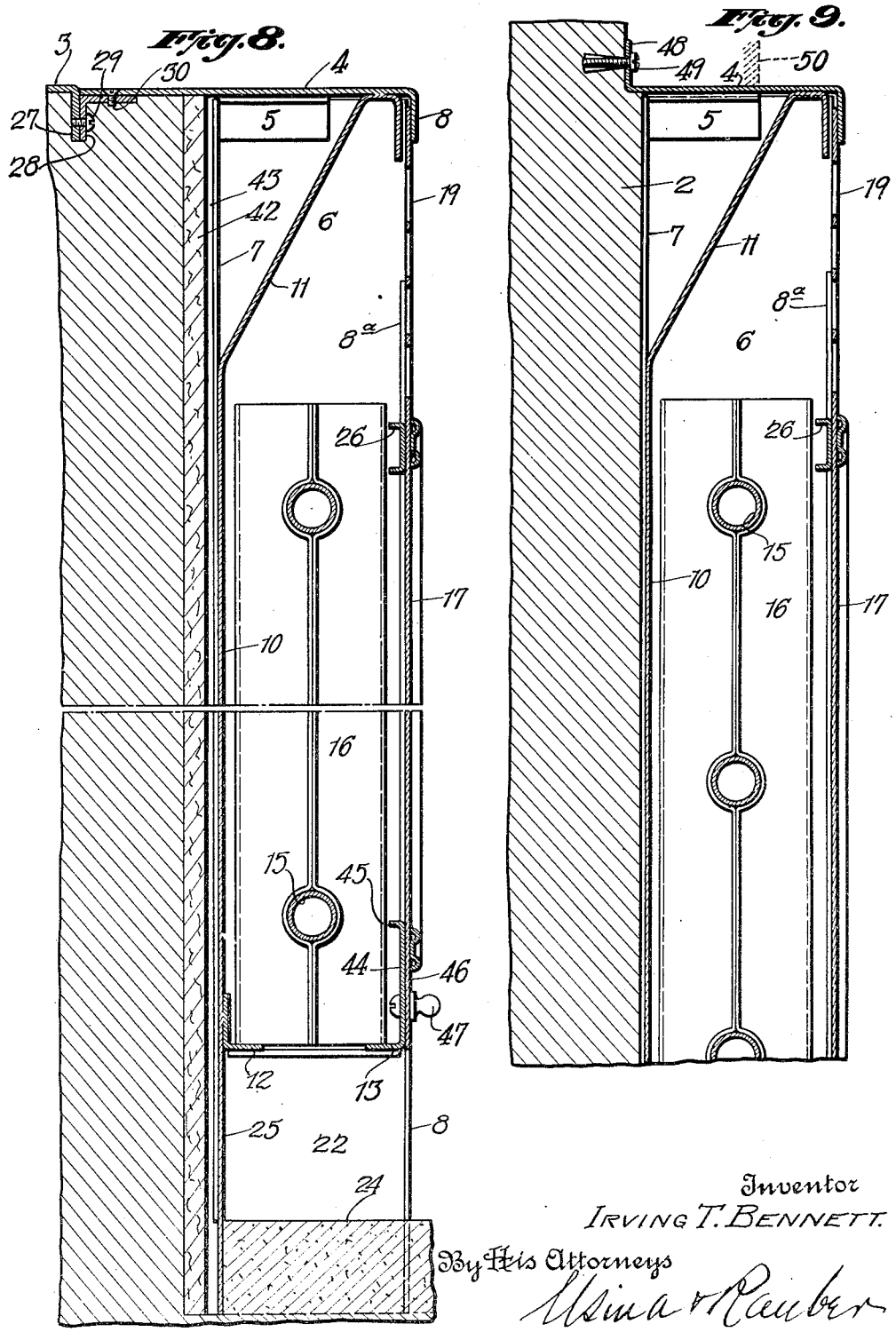
Inventor
IRVING T. BENNETT.
By His Attorneys

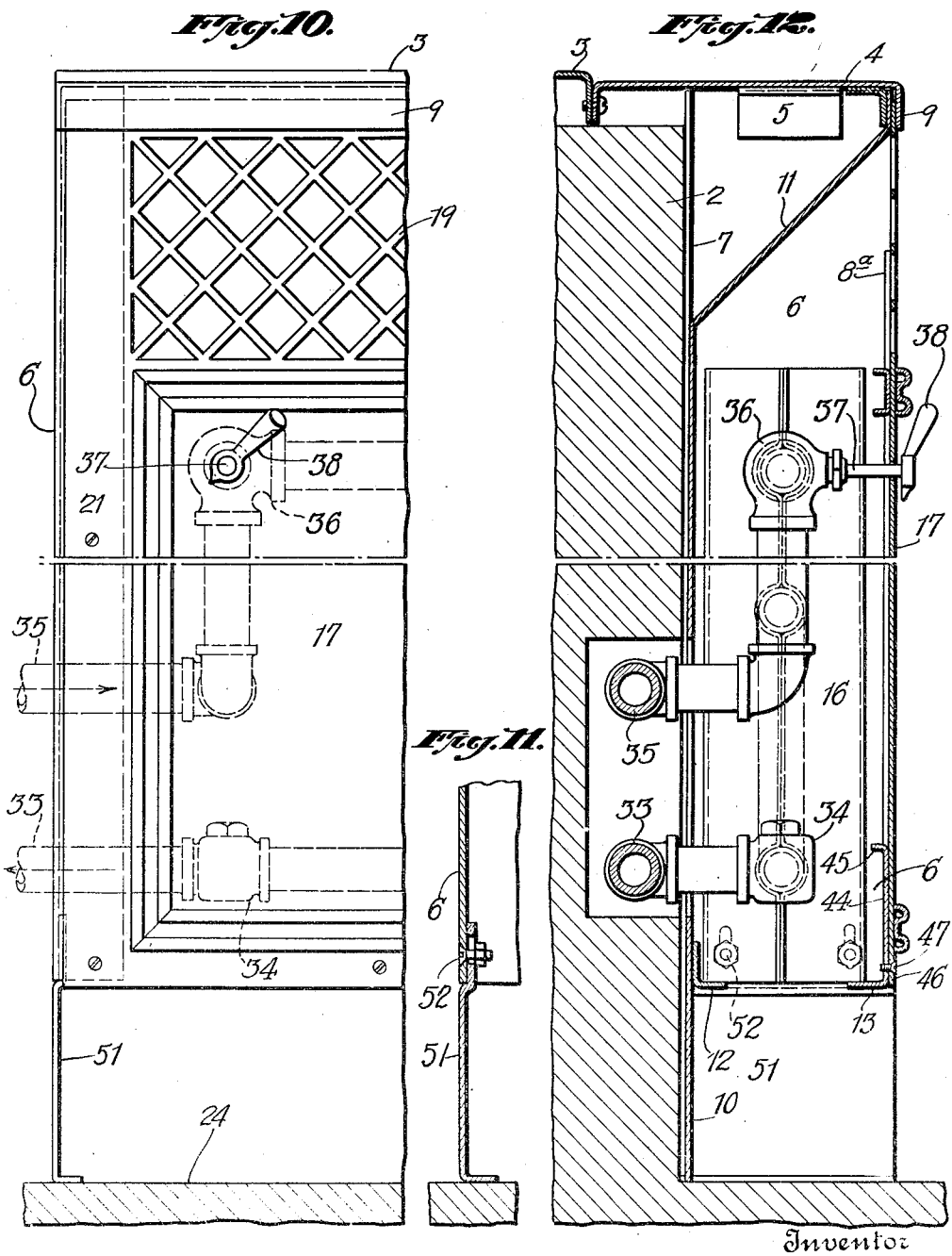

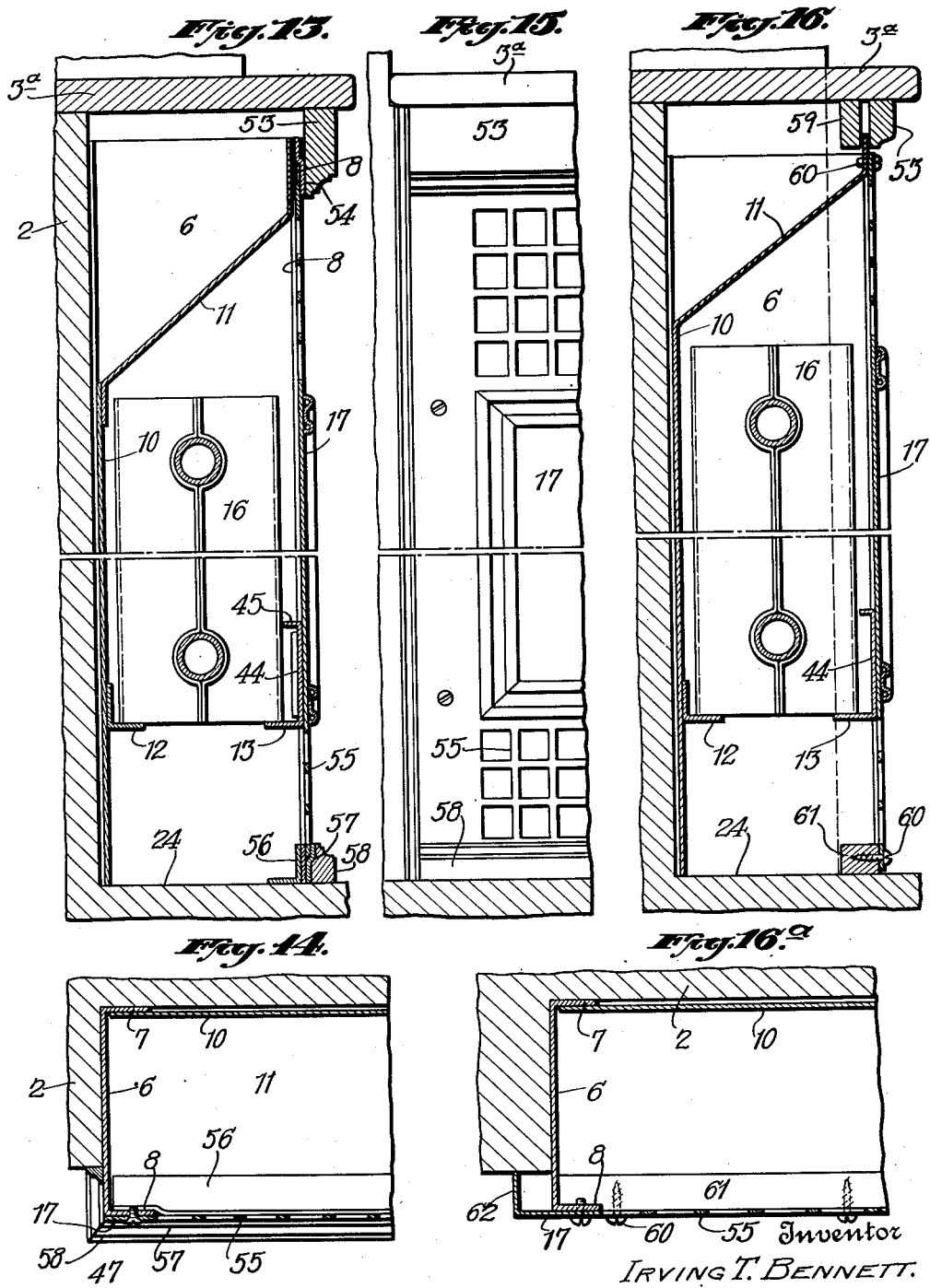

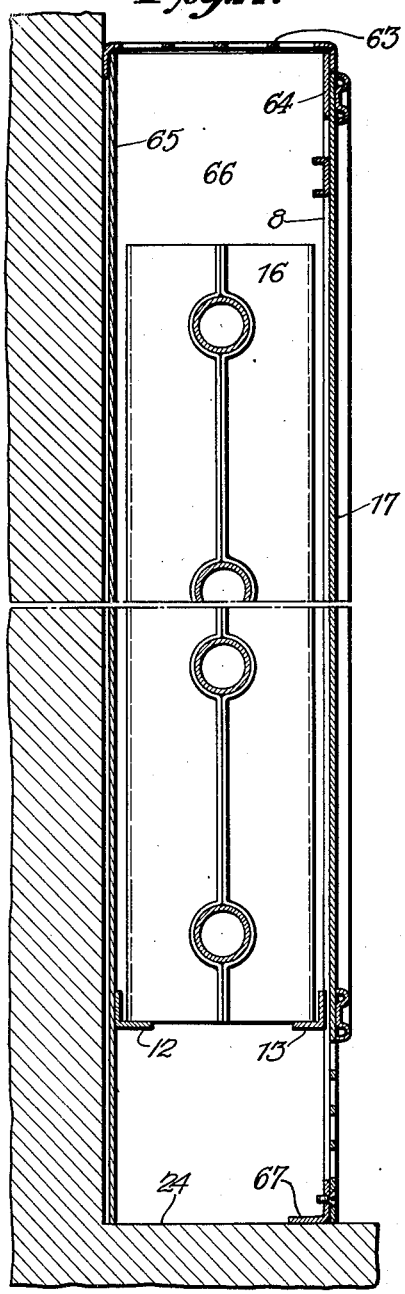
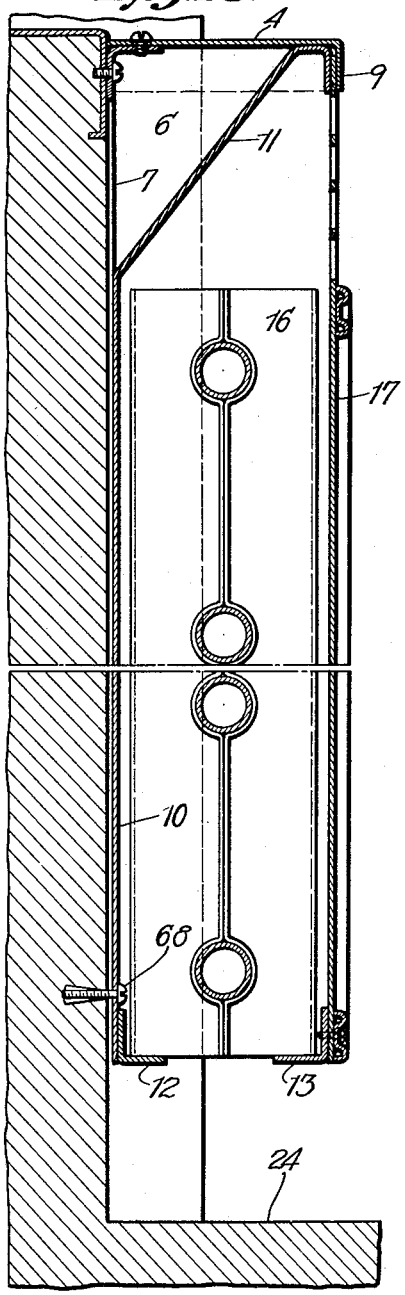

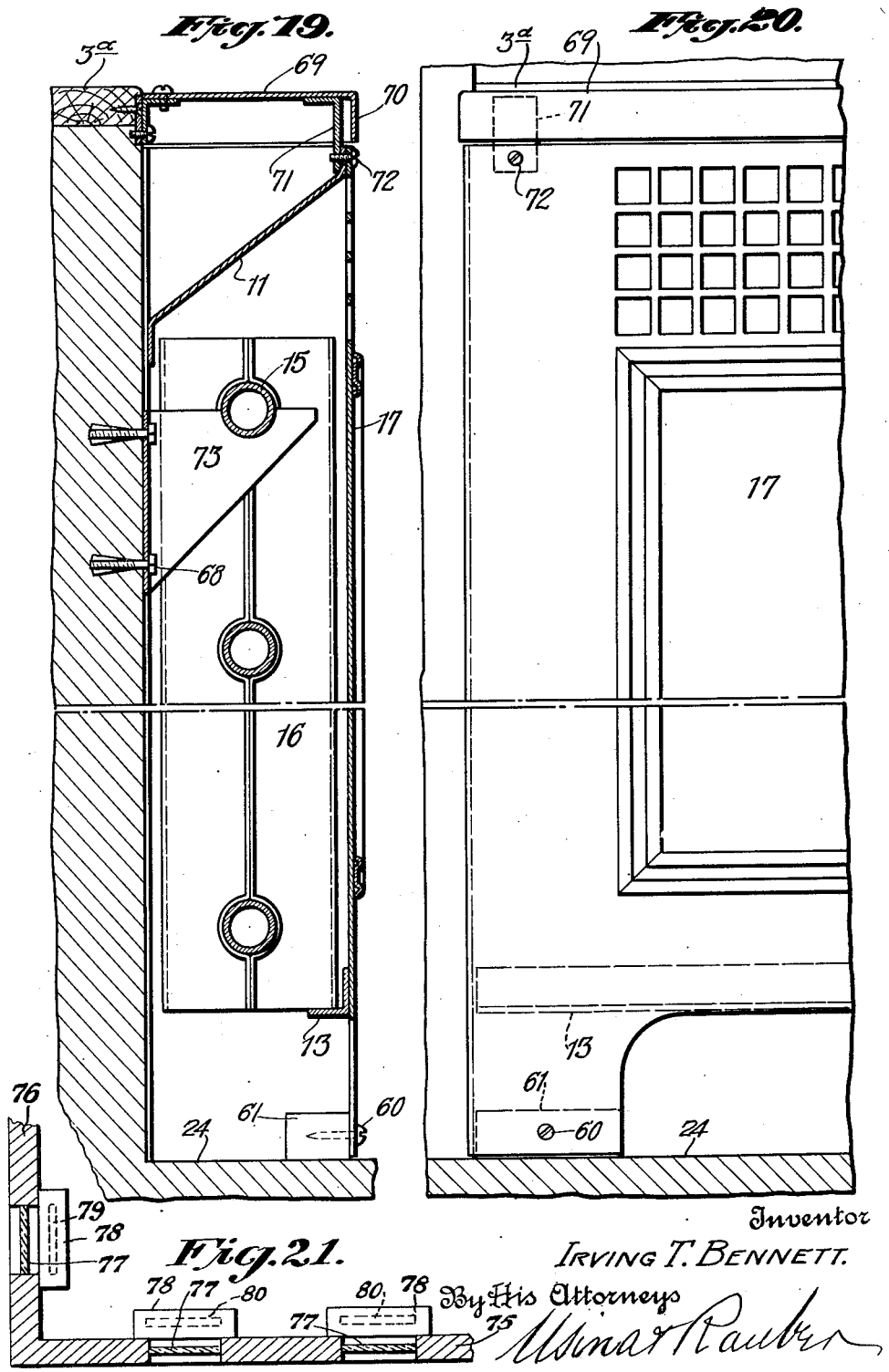

Patented Apr. 26, 1932

1,855,565

UNITED STATES PATENT OFFICE

IRVING T. BENNETT, OF BROOKLYN, NEW YORK, ASSIGNOR, BY MESNE ASSIGNMENTS, TO AMERICAN RADIATOR & STANDARD SANITARY CORPORATION, A CORPORATION OF DELAWARE

INCLOSURE FOR RADIATORS

Application filed April 15, 1929. Serial No. 355,059.

The invention aims to provide a special device or structure for use in the installation of radiators for heating rooms or buildings. With the aid of these inclosures the radiators can be economically installed with a very attractive appearance and with only a small requirement of floor space. The accompanying drawings illustrate embodiments of the invention.

Fig. 1 is a perspective view of a finished installation.

Fig. 2 is a front view of an inclosure containing a radiator.

Fig. 3 is a vertical section on the line 3—3 of Fig. 2.

Fig. 4 is a section on the line 4—4 of Fig. 2.

Fig. 5 is a plan of the same inclosure.

Fig. 6 is a vertical section on the line 6—6 of Fig. 2.

Fig. 7 is a horizontal section of the same on the line 7—7 of Fig. 2, showing different locations with reference to the face of the wall.

Fig. 8 is a broken vertical section similar to Fig. 3 but illustrating modfications in detail.

Fig. 9 is a similar partial section illustrating another arrangement.

Fig. 10 is a partial front elevation of another modification.

Fig. 11 is a detail thereof in vertical section.

Fig. 12 is a vertical section of Fig. 10 illustrating a modified arrangement of piping.

Figs. 13, 14 and 15 illustrate an arrangement for use with wooden window sills; Fig. 13 being a vertical section, Fig. 14 a horizontal section and Fig. 15 a front elevation of the same.

Fig. 16 is a vertical section of another installation in connection with wooden window sills.

Fig. 16ª is a horizontal section of one end of the same.

Figs. 17, 18 and 19 are vertical sections illustrating modifications in detail.

Fig. 20 is a front elevation of the design of Fig. 19.

Fig. 21 is a plan view of an arrangement of radiators and inclosures.

According to Fig. 1 the window frame has side members 1 which are substantially flush with the finished wall 2 and has an inside sill 3 which is generally alined or leveled very carefully. This fact may be utilized to facilitate the accurate leveling of the inclosure and of the radiator.

The inclosure, referring particularly to Figs. 2 to 7 is arranged to inclose the radiator on the back, the front and the two ends and for most cases also at the top. It is designed to be practically completed in the factory and transported to the building; thus avoiding considerable expense for the services of skilled workmen heretofore generally required to install inclosed radiators. A top plate 4 is attached by screws to short angles 5 at its ends, which angles are welded to the upper portions of end walls 6 of the inclosure. The ends 6 are channel shaped, with flanges 7 and 8 (Fig. 7) at their vertical edges. The flanges 8 of the opposite end walls form the side margins of a front wall, the upper margin of which is formed by a flange 9 on the front edge of the top plate 4. At the back, welded to the inner faces of the flanges 7 is a thin shield or wall 10 which extends from the bottom nearly to the top where it is continued in a forwardly inclined plate 11. The lower edge of the latter is welded to the rear flanges 7. The front edge 11ª is bent upward and welded to the inner faces of the front flanges 8 (Fig. 3). The flange 9 on the top plate is also fastened by screws 32 to the flanges 8 to hold the parts firmly together.

Near the lower end there is a longitudinal angle 12 welded along the plate 10 and a similar angle 13 welded at its ends to the front flanges 8 of the end pieces 6. The inturned flanges of the angles 12 and 13 constitute a direct support for the radiator, which is placed with its lower edge 14 resting directly thereon.

The inclosure is designed and particularly adapted for use with the Murray type of radiators utilizing a horizontal steam pipe 15 arranged in several parallel lengths (or other heating element) to which are applied corrugated sheets 16 providing an extended area and forming transverse fins between which are vertical passages in which the air is heated and a strong upward draft is induced. The supporting flanges 12 and 13 lie under only the outer portions of these ducts so as to leave a sufficiently free opening for admission of air.

Except around the margins as stated, the inclosure is open at the front so that after it is set in place the radiator can be introduced and connected to supply and discharge pipes. The front is then closed by means of a panel 17 which may be applied and fastened in various ways. A molding 18 is applied around the principal part of the panel so as to give it stiffness and an improved appearance. The upper part 19 registers with the inclined portion 11 of the back plate. These parts are above the radiator and serve to permit the free discharge of the heated air into the room. A groove is formed between the front flange 9 of the top plate and the forward portion 11ª of the plate 11. The flange 8 (Figs. 3 and 6) spaces the parts 9 and 11ª so far apart as to freely admit the upper part 19 of the panel, which then lies in the plane of the flange 8. Extensions 8ª are welded to the inner faces of the flanges 8, to provide backing strips for the side edges of the panel, so as to hold such edges flat and substantially flush with the flanges 8. At the lower edge of the panel an offset strip 20 is welded, forming a groove adapted to fit over the vertical portion of the angle 13.

To apply the panel, the upper edge is thrust well up into the groove between the parts 9 and 11ª at the top. The lower edge can then be pushed inward, the offset strip 20 passing above the top of the angle 13. The inward movement is limited by the lower portion of the panel bearing against the angle, and by the side portions of the panel bearing against the end strips 8ª. The panel is then dropped, the offset 20 locking the lower edge to the angle 13 and limiting the downward movement so that the upper edge is still locked in place. The side edges are then fastened against the strips 8ª by means of screws 21, Fig. 2 (or thumb nuts 21ª, Fig. 1).

The end pieces 6 are extended below the bottom of the inclosure proper to form legs 22. For buildings with concrete floors, these legs may be extended down to the level 23 of the base of the floor and enclosed in the concrete 24 which is afterwards applied as a surface finish. The back plate 10 may be similarly carried down by an extension 25. The front space, however, is left open and of sufficient height to permit the free entrance of cold air from the floor to the bottom of the radiator.

The inclosure may be leveled with such accuracy by connecting it to and alining it with a window sill, that the radiator will be accurately leveled when it rests on the supports 12 and 13. A channel 26 (Fig. 3) welded on the inner face of the panel serves to space the radiator properly between the panel and the back wall.

The window sill 3 is shown in Fig. 6 with a downward flange 27 at the front. The top plate 4 has an angle 28 attached by screws 29 to its rear edge and forming a downward flange which in turn is screwed to the flange 27 of the sill. The height of the top plate relative to the height of the sill can be varied by tapping the holes in the flange 27 for the screws 29 at a higher or lower level. Similarly the forward or backward adjustment of the top plate 4 may be varied by adjusting laterally the line along which it is fastened to the angle 28 by the screws 30. The top plate 4 is also fastened by screws 31 to the angles 5 on the tops of the end pieces 6, and by screws 32 on the forward flanges 8. The other parts of the inclosure may be welded together inseparably. But it is preferred to make the top plate detachable so that plates of different dimensions and designs may be substituted according to the location and design of the window sills.

Fig. 2 illustrates in dotted lines a radiator installed within the inclosure. A discharge pipe 33 passes up from the floor to connect with a thermostatic or other trap 34 connected to the end of the lower length of piping 15. A steam supply pipe 35 leads up to a valve 36, the outlet of which connects with the uppermost length of tubing 15 and the stem 37 of which extends up through the top of the inclosure and has an operating handle 38.

It is common to provide expansion joints in the supply and discharge pipes. But these have a certain resistance. It is therefore advisable to fasten the radiator down, so as to prevent accidental lifting of the end which might interfere with the free flow of the heating fluid.

For this purpose, a pair of straps 39 (Fig. 4) are arranged to straddle the lower length of piping 15 with their lower ends passing through openings in bars 40, where they are drawn down by nuts 41 which hold the radiator down throughout its length.

In the remaining figures of the drawings, a number of modifications in arrangement and details are described; which modifications may be separately or collectively applied to the structure of the first seven figures described above.

For example in Fig. 8 there is shown a top plate 4 to be used with a sill 3 which terminates back of the face of the wall. The plate is carried at the level of the sill and connected thereto in the same way as in Fig. 6. The top plate is also spot welded to the angles 5 and to the front flange 8 of the end pieces 6. The wall is also faced with a layer 42 of asbestos or other insulating material. And an air space 43 is left between the back of the inclosure and the face of the wall. At the bottom the angle 13 on which the radiator is supported has a comparatively long upward extension 44 with an inward flange 45 which serves to stiffen the plate and to space the lower end of the radiator. The front panel is slipped into a groove at the upper edge. But its lower portion 46 overlies the flange 44 and is fastened thereto by screws 47 in the same way as the sides of the panel.

Fig. 9 shows the inclosure applied directly to the wall 2. The top plate 4 has an upward flange 48 at its rear edge which is fastened directly to the wall by an expansion bolt 49. The plaster finish 50 is extended well forward over the top of the inclosure.

In Figs. 10 and 12 the legs 51 are separate pieces attached to the end pieces 6 by a bolt 52 passing through a slot which permits a slight vertical adjustment to permit bringing the legs down to the floor at both ends. Floors are sometimes uneven and this adjustment allows for it. In these figures also there is shown a different arrangement of the piping. The supply and discharge pipes 35 and 33 are carried in a recess in the wall back of the inclosure. The admission valve has its stem 37 projecting forward so that the operating handle 38 is on the face of the inclosure.

Figs. 13, 14 and 15 show an arrangement for use with a wooden sill 3ª. The sill projects beyond the wall 2. The top plate 4 of the inclosure is not necessary. The inclosure lies entirely under the sill and its upper edge is concealed by a molding 53. The deflecting plate 11 becomes the top plate and prevents the hot air from striking the under side of the sill. Fig. 14 shows that the inclosure is recessed into the wall 2. The extent of its projection will vary according to the design and finish of the wall in different cases. The front panel in this case extends at its upper edge into a groove between the flanges 8 and an offset plate 54 mounted on the upper portions of said flanges. The panel 17 extends over the space below the supporting angles 12 and 13, the extension 55 being perforated to admit air freely. The lower edge is slipped into a groove between the upright portion of an angle 56 mounted on the floor and an offset strip 57 welded to the angle. A concealing molding 58 on the floor covers the strip 57. The panel 17 extends laterally over the flanges 8 of the end pieces and is screwed directly to such flanges.

According to Fig. 16 the upper end of the deflecting plate 11 fits between the molding 53 and a bar 59 also fastened under the sill. The upper edge of the panel 17 is fastened by screws 60 directly to the upper portion of the deflecting plate 11. Its lower edge is fastened by similar screws 60 to a bar 61 fastened on the finished floor. In this case all the edges of the panel are on the outside, and the panel may be extended laterally beyond the end plates 6 as shown in Fig. 16ª and provided at their vertical edges with flanges 62 extending back to the plastered wall 2 to provide a neat finish.

Fig. 17 shows an inclosure which rests on the floor and is designed to discharge the heated air through a top plate 63 suitably perforated. The top plate has flanges at both front and back to the inner faces of which are welded a front plate 64 and a back plate 65. End walls 66 are similarly connected. The front plate is open except around its four edge portions and extends down to the floor where it has a bearing flange 67. The front panel 17 is fastened by screws at its edges to the edge portions of the strip 64.

Fig. 18 shows an arrangement similar to those previously described, except that there are no legs. The back plate 10 is fastened near its lower edge to the wall by means of expansion bolts 68.

Fig. 19 shows a wooden window sill 3ª and a metal extension sill consisting of a plate 69 fastened thereto. This constitutes in effect a hollow sill with a flange 70 at its front edge and with a rib 71 extending downward, to which the upper edge of the deflecting plate 11 and upper edge of the panel 17 are secured by screws 72.

In this construction also the back of the inclosure is open and wall brackets 73 project into the inclosure and have notches in which the upper length 15 of the radiator tubing rests, while the lower edge of the radiator rests on the forward support 13.

My improved inclosure lends itself easily to use with various arrangements of windows. For example, where two or more windows are arranged close together with only a mullion between them, the inclosures may be abutted directly against one another at their ends with front panels which also abut at their edges. A single inclosure can be made for two or more separate radiators, either with a single removable panel or with a number of panels corresponding to the number of radiators. In many buildings all the windows are made of the same size whereas radiators of varying size and capacity are used at different localities to accommodate the heater to the direction of the exposure of the wall and other conditions. With the present invention the inclosures at different localities may all be made the same size while the radiators therein are of different sizes.

Such an arrangement is shown, for example, in Fig. 21. Two walls 75, 76 at an angle to each other have windows 77 there-through and radiator inclosures 78 of uniform size in front of said windows. But because the wall 76 does not require the same heat as the wall 75, the radiators 79 along the wall 76 are made smaller than the radiators 80 along the wall 75.

The inclosures are made practically complete at the factory and transported as complete units so that the setting of the inclosure is a very simple matter. And the installation of the radiator requires only the usual connecting operations followed by the application of the covering panel in front of the inclosure. Thus skilled work on the job, which has always been expensive in installing inclosed radiators, is reduced to a minimum.

For economy and ease of transportation several parts of the inclosure are preferably made of thin sheet metal. Nevertheless they are so connected and placed as to form a stiff structure which can be transported without serious risk or injury.

Not only is the installing of the inclosure a simple matter, but also the installing of the radiator within the inclosure. In the factory it is built so that when its base is level there will be the proper inclination of the steam pipe or other conduit. Then in installing if it needs only to be lowered on the supports provided within the inclosure. The care usually required in levelling radiators which are hung from a wall or other part of the building is not necessary with the present invention.

Although the inclosure is shown with a Murray radiator which is especially designed with flues in which the air is heated and subjected to a strong induced draft so as to be particularly adapted for circulating the heat through the room rather than radiating it directly, yet the inclosure has advantages also for radiators of other types. The inclosure itself with its openings below and above the radiator discharging either at the front or through the top, itself forms a flue which induces an upward draft of the air heated by the radiator therein and thus effects a circulation as well as a heating of the air. The air discharge may be arranged either through the front or through a horizontal top plate for all of the various styles of inclosure above referred to, or indeed the top plate may be inclined and perforated for the air discharge.

The casing is so strong and so well supported that it will stand the usual practice of window cleaners, using it as a step to mount on to the window sill, or to stand on while cleaning the inside of the window. In this and similar uses, a man's weight is concentrated on the small area of one or both his feet. Radiators of the light construction illustrated could not be subjected without injury to such loads. One of the points of advantage of the improved inclosure is that it is capable of sustaining such concentrated weights and is supported independently of the radiator, which can thus be made of the desired light construction.

Various modifications may be made by those skilled in the art without departing from the invention as defined in the following claims:

1. An inclosure for a radiator having a top, end walls and a front, all attached to one another, said inclosure being attached to and aligned with the sill of a window of the room to be heated, said inclosure having an opening through which a radiator can be introduced and means for closing said opening.

2. An inclosure for a radiator having a top, end walls and a front, all attached to one another, in combination with means for attaching it to and aligning it with the sill of a window of the room to be heated, said inclosure having an opening through which a radiator can be introduced and means for closing said opening.

3. The combination with a radiator of a support therefor on which the base of the radiator rests and means for connecting and aligning said support with the sill of a window of the room to be heated.

4. The combination with a radiator of a support therefor on which the base of the radiator rests and means for mounting and leveling the position of said support.

5. The combination of a number of inclosures of a fixed size located in a space to be heated, each including a support adapted to carry radiators of different sizes and radiators of different sizes carried by the supports in the several inclosures.

6. A transportable article of manufacture comprising an inclosure for a radiator and having front, back and end walls and draft passages and adapted to be installed entirely beyond the face of the wall or partially or completely within the wall, said inclosure having an opening through which a radiator can be introduced and means for closing said opening.

7. An inclosure for a radiator having an opening through which the radiator can be introduced and a removable panel for closing said opening and means constituting part of the inclosure for supporting the panel in the closed position, at least one edge of the panel being located within the surrounding portion of the structure and held thereby in the closing position.

8. The combination with an inclosure having a support for a radiator, of a radiator having connections to the heat source and having its base resting on said support, and means in addition to said connections for fastening the radiator down so that it shall not rise from such support.

9. An inclosure for a radiator comprising a top plate, end walls and back and front plates, the upper portion of the inclosure being open to permit the exit of heated air and a portion of the front of the inclosure being open to permit the introduction of the radiator and a radiator-support within the inclosure below the front opening.

10. An inclosure for a radiator comprising a top plate, end walls and back and front plates, the upper portion of the front plate being open to permit the exit of heated air, a portion of the front of the inclosure being removable to permit the introduction of the radiator and said inclosure carrying within it means for supporting a radiator with its base below the front opening.

11. An inclosure for a radiator comprising in combination a support for the base of the radiator adapted to hold the radiator at a fixed distance outward from the wall and a front plate removable from said inclosure and support and adapted to cover the radiator at the front and having a lower portion whose distance from the wall is determined by the distance to which said support projects from the wall.

12. The combination with an inclosure for a radiator, said inclosure having a top, end walls and a front, all permanently attached to each other to constitute a complete unitary structure independently of the building wall and separately from the radiator, of means for attaching said inclosure to a window sill.

13. The combination with an inclosure for a radiator, said inclosure having a top, end walls and a front, all permanently attached to each other to constitute a complete unitary structure independently of the building wall and separately from the radiator, of a support carried by said inclosure and on which the radiator can be removably supported, and means for attaching said inclosure to a window sill.

14. An article of manufacture comprising an inclosure for a radiator, said inclosure comprising a front wall with an opening through which a radiator can be introduced, a movable closure for said opening and supporting means for the radiator carried by the fixed part of the inclosure, so that the radiator can be mounted and connected while said closure is out of the way.

15. The combination with an inclosure for a radiator, said inclosure having a top, end walls and a front, all permanently attached to each other to constitute a complete unitary structure independently of the building wall and separately from the radiator, of means for attaching said inclosure to a window sill with its lower edge above the floor, said inclosure having also legs extending from such lower edge to the floor.

In witness whereof, I have hereunto signed my name.

IRVING T. BENNETT.